US011551645B2

(12) United States Patent
Imamura et al.

(10) Patent No.: US 11,551,645 B2
(45) Date of Patent: Jan. 10, 2023

(54) INFORMATION PROCESSING SYSTEM, INFORMATION PROCESSING METHOD, AND COMPUTER PROGRAM

(71) Applicant: SONY INTERACTIVE ENTERTAINMENT INC., Tokyo (JP)

(72) Inventors: Takashi Imamura, Tokyo (JP); Masashi Nakata, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/055,397

(22) PCT Filed: Jun. 7, 2018

(86) PCT No.: PCT/JP2018/021822
§ 371 (c)(1),
(2) Date: Nov. 13, 2020

(87) PCT Pub. No.: WO2019/234879
PCT Pub. Date: Dec. 12, 2019

(65) Prior Publication Data
US 2021/0158781 A1 May 27, 2021

(51) Int. Cl.
*G09G 5/37* (2006.01)
*G06Q 30/02* (2012.01)
(Continued)

(52) U.S. Cl.
CPC ........... *G09G 5/37* (2013.01); *G06Q 30/0269* (2013.01); *G06Q 50/01* (2013.01); *G09G 5/38* (2013.01);
(Continued)

(58) Field of Classification Search
None
See application file for complete search history.

(56) References Cited

U.S. PATENT DOCUMENTS

| 2013/0117783 | A1 | 5/2013 | Kim |
| 2014/0012792 | A1* | 1/2014 | Huang ................ G06N 5/02 706/46 |

(Continued)

FOREIGN PATENT DOCUMENTS

| CN | 107197384 B * | 8/2019 | ........... H04N 21/442 |
| JP | 2011-096202 A | 5/2011 | |

(Continued)

OTHER PUBLICATIONS

International Search Report and Written Opinion dated Jul. 10, 2018, from PCT/JP2018/021822, 15 sheets.
(Continued)

*Primary Examiner* — Yi Wang
(74) *Attorney, Agent, or Firm* — Katten Muchin Rosenman LLP

(57) ABSTRACT

A live streaming system 10 identifies, with regard to a plurality of users each wearing an HMD 100 to watch same content, types of emotions that the plurality of users are experiencing based on information associated with the plurality of users, the information being detected by a predetermined apparatus. The live streaming system 10 generates, as an image to be displayed on the HMD 100 of a certain user of the plurality of users, an image including the content and at least one of a plurality of avatars corresponding to the plurality of users. The live streaming system 10 changes display appearances of the plurality of avatars depending on the types of emotions that the plurality of users are experiencing.

8 Claims, 11 Drawing Sheets

(51) Int. Cl.
 *G06Q 50/00* (2012.01)
 *G09G 5/38* (2006.01)
(52) U.S. Cl.
 CPC . *G09G 2340/0464* (2013.01); *G09G 2354/00* (2013.01)

(56) References Cited

U.S. PATENT DOCUMENTS

| | | | |
|---|---|---|---|
| 2018/0165863 A1 | 6/2018 | Kubo et al. | |
| 2018/0273345 A1* | 9/2018 | Rao | B66B 3/008 |
| 2018/0373328 A1 | 12/2018 | Sawaki | |

FOREIGN PATENT DOCUMENTS

| | | | |
|---|---|---|---|
| JP | 2013-516831 A | | 5/2013 |
| JP | 2017-167752 A | | 9/2017 |
| JP | 2017167752 A | * | 9/2017 |
| JP | 6263252 B1 | | 1/2018 |
| JP | 6298561 B1 | | 3/2018 |
| WO | 2011/052685 A1 | | 5/2011 |
| WO | 2017110632 A1 | | 6/2017 |

OTHER PUBLICATIONS

Wan, K.D. et al., "Analysis of expressing audiences in a cyber-theater", Proceedings of 2005 IEEE International Conference on Multimedia and Expo, Jul. 6, 2005, pp. 1-4, ISBN: 0-7803-9331-7, <DOI:10.1109/ICME.2005.1521526>, especially, see abstract, sections 3, 4, 5.1, 5.2, fig. 2, 3, 7, 8.

Liu, Q. et al., Study of representing audiences in a cyber-theater, IEICE Technical Report, vol. 108, No. 487, Mar. 16, 2009, pp. 37-41, ISSN: 0913-5685, especially, see figure 5 and three lines just after figure 5.

International Preliminary Report on Patentability dated Dec. 17, 2020, from PCT/JP2018/021822, 29 sheets.

\* cited by examiner

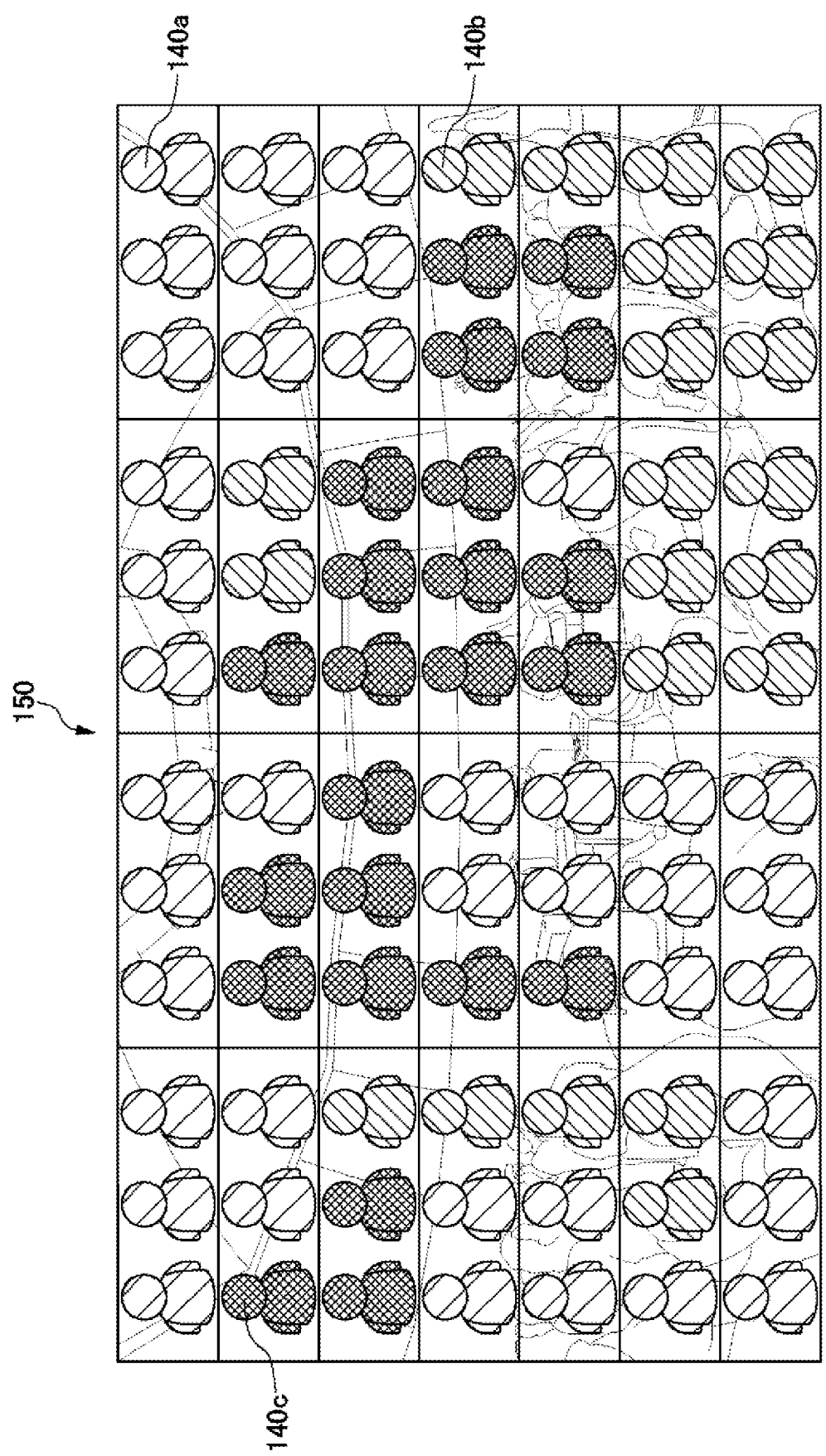

INFORMATION PROCESSING SYSTEM, INFORMATION PROCESSING METHOD, AND COMPUTER PROGRAM

TECHNICAL FIELD

The present invention relates to a data processing technology, in particular, to an information processing system, an information processing method, and a computer program.

BACKGROUND ART

There has been developed a system configured to display, on a head mounted display (hereinafter also referred to as "HMD"), a virtual reality (also called virtual space, hereinafter also referred to as "VR") image, and display, when a user wearing the HMD moves his/her head, a VR image corresponding to the change in sight direction on the HMD. Using HMDs can give users more immersive virtual reality experiences.

CITATION LIST

Patent Literature

PTL 1

PCT Patent Publication No. WO 2017/110632

SUMMARY

Technical Problem

While HMDs have become widespread, it is demanded to give users wearing HMDs to watch VR images unique viewing experiences.

The present invention has been made in view of such a problem, and it is an object of the present invention to provide a technology that supports giving users using HMDs unique viewing experiences.

Solution to Problem

In order to solve the above-mentioned problem, according to a certain mode of the present invention, there is provided an information processing system including an identification unit configured to identify, with regard to a plurality of users each wearing a head mounted display to watch same content, types of emotions that the plurality of users are experiencing based on information associated with the plurality of users, the information being detected by a predetermined apparatus, and a generation unit configured to generate, as an image to be displayed on the head mounted display of a certain user of the plurality of users, an image including the content and at least one of a plurality of avatars corresponding to the plurality of users. The generation unit changes display appearances of the plurality of avatars depending on the types of emotions of the plurality of users identified by the identification unit.

Also, according to another mode of the present invention, there is provided an information processing system. This information processing system includes an identification unit configured to identify a type of emotion that a user watching predetermined content is experiencing based on information associated with the user, the information being detected by a predetermined apparatus, and a generation unit configured to generate, in a case where the emotion of the user identified by the identification unit satisfies a predetermined condition, as an image to be presented to the user, an image including the content and information for promoting sales of a predetermined product.

Also, according to still another mode of the present invention, there is provided an information processing system. This information processing system includes an identification unit configured to identify, with regard to a plurality of users each wearing a head mounted display to watch same content, types of emotions that the plurality of users are experiencing based on information associated with the plurality of users, the information being detected by a predetermined apparatus, a detection unit configured to detect each of viewpoints of the plurality of users in the content based on a posture of the head mounted display worn by the corresponding users, and a recording unit configured to record, with regard to each of the plurality of viewpoints in the content, information associated with the types of emotions that the users at the respective viewpoints have experienced.

Also, according to yet another mode of the present invention, there is provided an information processing method. This method includes causing a computer or a plurality of computers to execute, in a distributed manner, the steps of identifying, with regard to a plurality of users each wearing a head mounted display to watch same content, types of emotions that the plurality of users are experiencing based on information associated with the plurality of users, the information being detected by a predetermined apparatus, and generating, as an image to be displayed on the head mounted display of a certain user of the plurality of users, an image including the content and at least one of a plurality of avatars corresponding to the plurality of users, in which the step of generating changes display appearances of the plurality of avatars depending on the types of emotions that the plurality of users are experiencing.

Note that, optional combinations of the above-mentioned components and expressions of the present invention changed between an apparatus, a method, a system, a program, a recording medium having programs stored therein, and the like are also effective as the modes of the present invention.

Advantageous Effect of Invention

According to the present invention, it is possible to support giving users using HMDs unique viewing experiences.

BRIEF DESCRIPTION OF DRAWINGS

FIG. 12 is a diagram illustrating an exemplary analysis result.

DESCRIPTION OF EMBODIMENT

The outlie of a system of an embodiment is described prior to a description of the detailed configuration thereof. It is conceivable that the number of applications that allow users wearing HMDs to watch VR images including live streaming images of real events will increase in the future. As a typical use case, watching sports, music events (concerts), or the like is given.

A large number (for example, tens of thousands) of users having similar hobbies or preferences may use HMDs to simultaneously watch the same live streamed event (a sporting event, a concert, or the like). The inventors of the present invention have conceived that when a large number of users watching the same event can share their emotions such as being happy, impressed, or excited, more highly entertaining VR experiences can be achieved.

However, it is unrealistic that a user wearing an HMD expresses his/her emotions using a keyboard. Accordingly, the system of the embodiment (a live streaming system 10 described later) arranges, in VR space including a distributed event, a plurality of avatars corresponding to a plurality of users watching the event. The system automatically identifies the types of emotions that the plurality of users are experiencing, and changes the display appearances of the corresponding avatars on the basis of the types of emotions that the plurality of users are experiencing. With this, the users can share their emotions therebetween.

Figure 1:
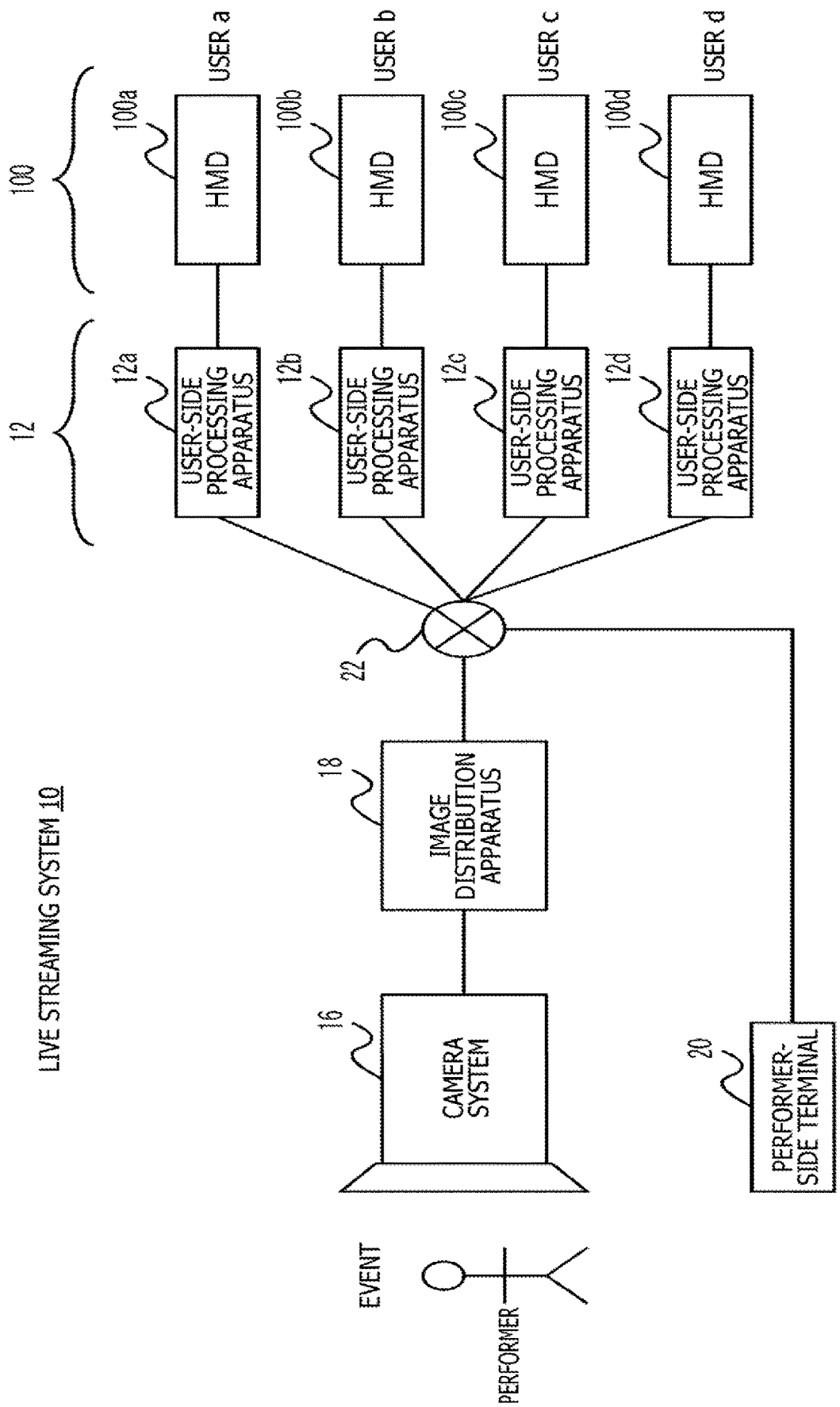
FIG. 1 is a diagram illustrating a configuration of a live streaming system of an embodiment.

FIG. 1 illustrates the configuration of the live streaming system 10 of the embodiment. The live streaming system 10 is an information processing system configured to image an ongoing real event, and display, on HMDs of users, a VR image indicating how the event is going.

The live streaming system 10 includes a user-side processing apparatus 12a and an HMD 100a that are used by a user a, a user-side processing apparatus 12b and an HMD 100b that are used by a user b, a user-side processing apparatus 12c and an HMD 100c that are used by a user c, and a user-side processing apparatus 12d and an HMD 100d that are used by a user d. In the following, the user-side processing apparatus 12a to the user-side processing apparatus 12d may be collectively and simply referred to as "user-side processing apparatus 12," and the HMD 100a to the HMD 100d may be collectively and simply referred to as "HMD 100."

The user-side processing apparatus 12 is an information processing apparatus configured to control the display of VR images on the HMD 100. The user-side processing apparatus 12 may be, for example, a stationary game console, a PC, a tablet terminal, or a smartphone. The HMD 100 may be a well-known head mounted display. The user-side processing apparatus 12 and the HMD 100 may be connected to each other through a cable or known wireless communication protocol. Note that, the user-side processing apparatus 12 and the HMD 100 may be integrated, and the HMD 100 may have the functions of the user-side processing apparatus 12 described later.

The live streaming system 10 further includes a camera system 16, an image distribution apparatus 18, and a performer-side terminal 20. The image distribution apparatus 18, the user-side processing apparatus 12, and the performer-side terminal 20 of FIG. 1 are connected to each other through a communication network 22 including a local area network (LAN), a wide area network (WAN), the Internet, or the like.

The camera system 16 includes a plurality of cameras configured to image an event from different positions. The plurality of cameras are provided at a plurality of watching positions (for example, positions corresponding to a plurality of seats in a concert venue) different from each other. Further, the plurality of cameras image the event, the performance of a performer, and the like from angles different from each other. The camera system 16 outputs, to the image distribution apparatus 18, a plurality of images indicating the event viewed from the different positions, which have been imaged by the plurality of cameras (hereinafter also referred to as "event image").

The image distribution apparatus 18 generates VR images to be displayed on the respective HMDs 100 (hereinafter also referred to as "user image"). The user images include event images output from the camera system 16. The image distribution apparatus 18 distributes the user images to the plurality of user-side processing apparatus 12 and displays the user images on the HMDs 100.

The performer-side terminal 20 is an information processing apparatus installed in the location of an event performer. The performer-side terminal 20 may be, for example, a PC, a tablet terminal, or a smartphone. The image distribution apparatus 18 generates an image that includes information to be presented to the event performer and is to be displayed on the performer-side terminal 20 (hereinafter also referred to as "performer image"). The image distribution apparatus 18 distributes the performer image to the performer-side terminal 20 and displays the performer image on the display of the performer-side terminal 20. The image distribution apparatus 18 of the embodiment is an emotion information aggregation apparatus configured to acquire emotion information regarding a plurality of users and reflect the acquired emotion information in user images and performer images.

Figure 2:
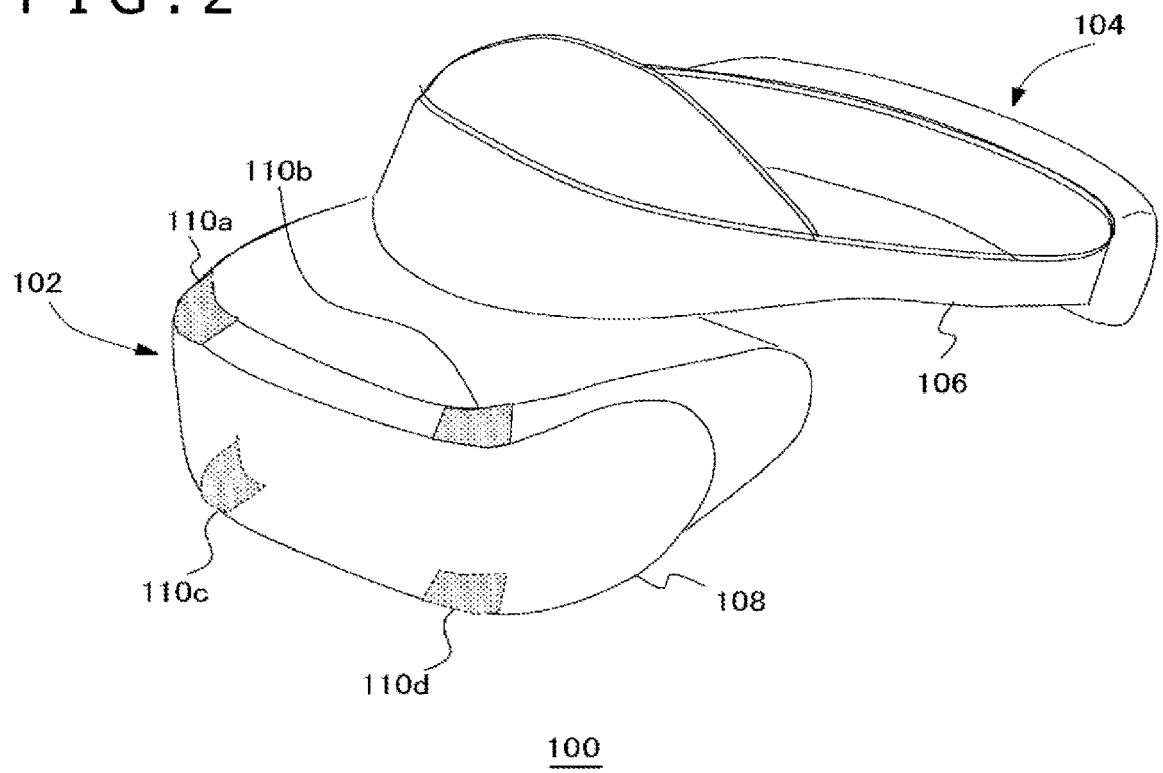
FIG. 2 is a diagram illustrating an exemplary appearance of an HMD of FIG. 1.

FIG. 2 illustrates an exemplary appearance of the HMD 100 of FIG. 1. The HMD 100 includes an output mechanism 102 and a wearing mechanism 104. The wearing mechanism 104 includes a wearing band 106 configured to wrap around the head of the user when he/she wears the HMD 100 to fix the HMD 100 onto the head. The wearing band 106 includes a material or has a structure that allows the wearing band 106 to be adjusted depending on the head girth of the user.

The output mechanism 102 includes a casing 108 having a shape that covers the left and right eyes of the user when he/she wears the HMD 100, and contains a display panel that faces the eyes when the user wears the HMD 100. The display panel may be a liquid crystal panel, an organic electroluminescent (EL) panel, or the like. Inside the casing 108, a pair of left and right optical lenses configured to expand the viewing angle of the user, which is positioned between the display panel and the user's eyes, is further provided. The HMD 100 may further include speakers or earphones at positions corresponding to the ears of the user or may be connected to an external headphone.

On the external surface of the casing 108, luminescent markers 110a, 110b, 110c, and 110d are provided. Light emitting diodes (LEDs) for tracking serve as the luminescent markers 110 in this example, but another type of markers may be used. In any case, it is enough that markers can be imaged by an imaging apparatus of the user (hereinafter also referred to as "user camera"), and the positions thereof can be analyzed by the user-side processing apparatus 12 by image analysis. Although the number and arrangement of the luminescent markers 110 are not particularly limited, it is necessary that a sufficient number of the luminescent markers 110 are arranged so that the posture of the HMD 100 can be detected. In the example illustrated in FIG. 2, the luminescent markers 110 are provided at the four corners of the front surface of the casing 108. Further, to image the luminescent markers 110 even when the user has his/her back to the user camera, the luminescent markers 110 may be provided on the side portions or rear portion of the wearing band 106. The HMD 100 transmits sensor data detected by the posture sensor 124 to the user-side processing apparatus 12. Further, the HMD 100 receives image data transmitted from the user-side processing apparatus 12 and displays the images on a left-eye display panel and a right-eye display panel.

Figure 3:
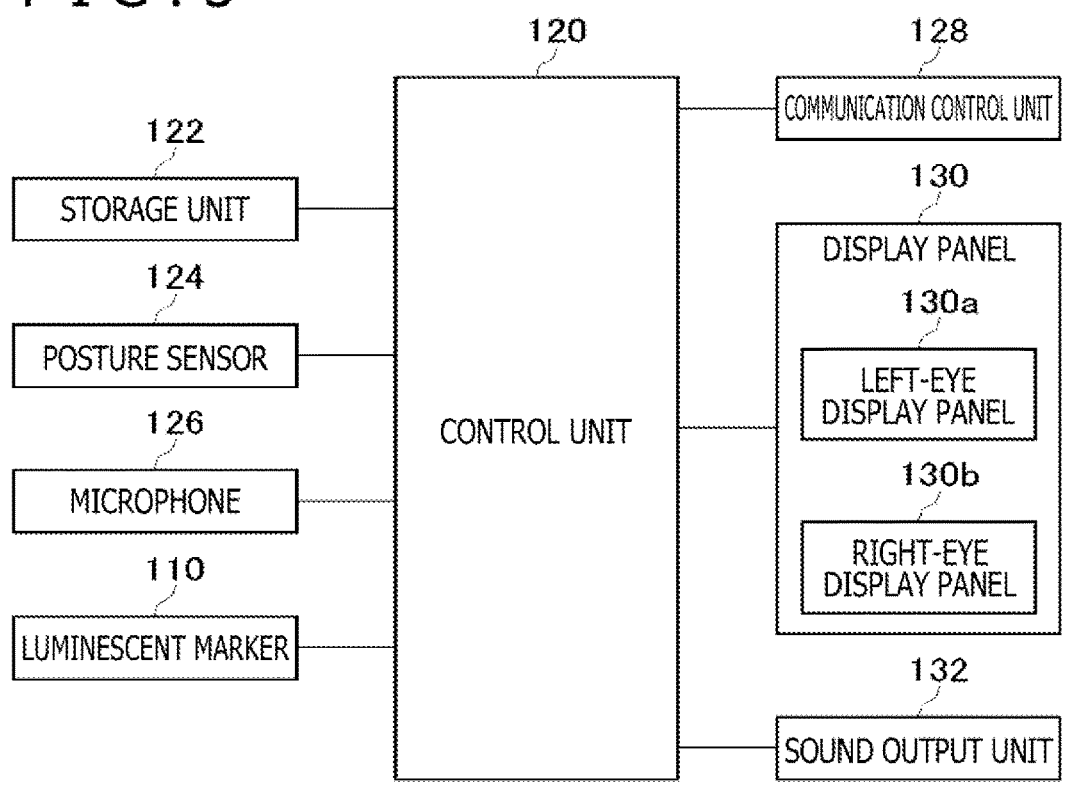
FIG. 3 is a block diagram illustrating functional blocks of the HMD of FIG. 1.

FIG. 3 is a block diagram illustrating functional blocks of the HMD 100 of FIG. 1. Each block illustrated in the block diagrams herein can be implemented, in terms of hardware, by an element, an electronic circuit, or a mechanical apparatus such as a central processing unit (CPU) of a computer or a memory, and implemented, in terms of software, by a computer program or the like. FIG. 3, however, illustrates the functional blocks implemented by a combination of hardware and software. Thus, it is to be understood by those skilled in the art that these functional blocks can be implemented in various forms by combinations of hardware and software.

A control unit 120 is a main processor configured to process and output various types of data such as image data, sound data, and sensor data, and commands. A storage unit 122 temporarily stores data, commands, and the like to be processed by the control unit 120. A posture sensor 124 detects information regarding the posture of the HMD 100. The posture sensor 124 at least includes a 3-axis accelerometer and a 3-axis gyroscope.

A communication control unit 128 transmits data output from the control unit 120 to the user-side processing apparatus 12, which is an external apparatus, through a network adapter or an antenna by wired or wireless communication. Further, the communication control unit 128 receives data from the user-side processing apparatus 12 through the network adapter or the antenna by wired or wireless communication, and outputs the data to the control unit 120.

When receiving image data or sound data from the user-side processing apparatus 12, the control unit 120 supplies the image data to a display panel 130 to display the image on the display panel 130, or supplies the sound data to a sound output unit 132 to output the sound from the sound output unit 132. The display panel 130 includes a left-eye display panel 130a and a right-eye display panel 130b, and a pair of parallax images is displayed on the corresponding display panel. Further, the control unit 120 transmits sensor data from the posture sensor 124 and sound data from a microphone 126 from the communication control unit 128 to the user-side processing apparatus 12.

Figure 4:
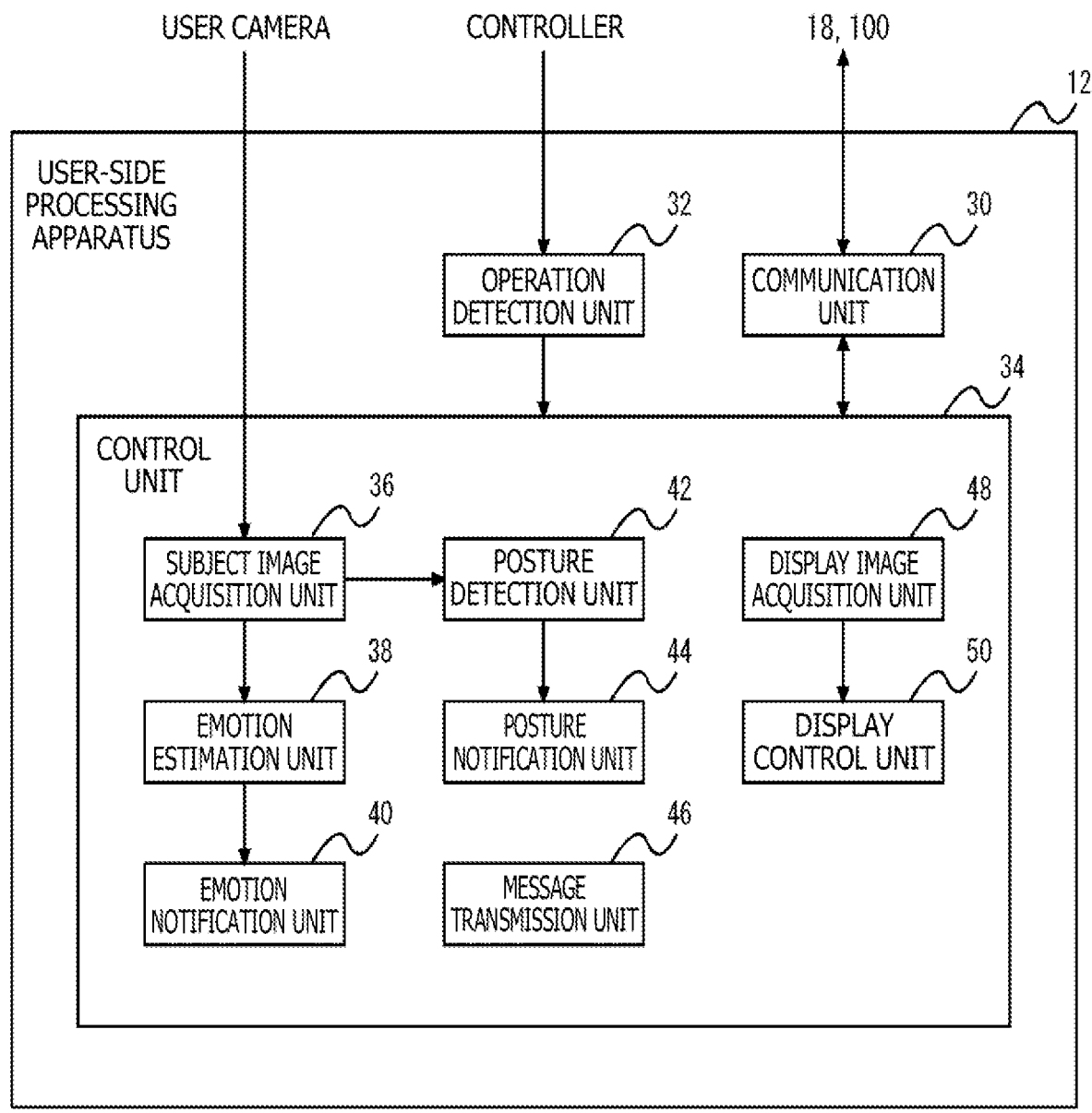
FIG. 4 is a block diagram illustrating functional blocks of a user-side processing apparatus of FIG. 1.

FIG. 4 is a block diagram illustrating functional blocks of the user-side processing apparatus 12 of FIG. 1. The user-side processing apparatus 12 includes a communication unit 30, an operation detection unit 32, and a control unit 34. The control unit 34 executes various types of data processing. The communication unit 30 communicates with external apparatus in accordance with a predetermined communication protocol. The control unit 34 transmits/receives, through the communication unit 30, data to/from the image distribution apparatus 18 and the HMD 100. The operation detection unit 32 detects operation input by the user to a controller, which is not illustrated, (certain button pressing, joystick directional input, or the like). The operation detection unit 32 inputs data indicating the detected operation to the control unit 34.

The control unit 34 includes a subject image acquisition unit 36, an emotion estimation unit 38, an emotion notification unit 40, a posture detection unit 42, a posture notification unit 44, a message transmission unit 46, a display image acquisition unit 48, and a display control unit 50. A computer program having a plurality of modules corresponding to the plurality of functional blocks (for example, a concert video watching application) may be installed on the storage of the user-side processing apparatus 12. The CPU and/or GPU of the user-side processing apparatus 12 may read out the computer program to the main memory to execute the computer program, thereby fulfilling the function of each functional block.

The subject image acquisition unit 36 acquires image data output from the user camera that is a camera configured to image, as a subject, the user him/herself wearing the HMD 100. This image data at least indicates the facial expression of the user wearing the HMD 100 and is hereinafter also referred to as "subject image."

The emotion estimation unit 38 estimates the type of emotion of the user on the basis of a subject image acquired by the subject image acquisition unit 36. Examples of types of emotions include being impressed, excited, curious, surprised, happy, and the like. Further, the types of emotions include the levels of emotions, for example, the level of excitement and the level of impression. The emotion estimation unit 38 may estimate the type of emotion of the user by well-known image analysis processing and emotion recognition processing. Further, in the subject image, the upper part of the face of the user is hidden in the HMD 100. Accordingly, the emotion estimation unit 38 may estimate the facial expression of the user on the basis of the middle and lower parts of the face of the user appearing in the subject image, to thereby estimate the type of emotion of the user from the facial expression of the user.

For example, in a case where a subject image indicates that the user has a dropped chin and an open mouth, the emotion estimation unit 38 may estimate the emotion of the user as "being surprised." Further, in a case where a subject image indicates that the user has a raised upper lip, the emotion estimation unit 38 may estimate the emotion of the user as "being disgusted." Further, in a case where a subject image indicates that the user has wrinkles from the nose to both the corners of the lips and the lips with raised corners, the emotion estimation unit 38 may estimate the emotion of the user as "being happy."

Although the emotion estimation unit 38 estimates the emotion of the user on the basis of the facial expression of the user in the embodiment, in a modified example, the emotion estimation unit 38 may estimate the emotion of the user on the basis of another element instead of the facial expression of the user, or of the facial expression of the user and another element. For example, the emotion estimation unit 38 may estimate the type of emotion of the user on the basis of the sight direction of the user detected by a sight detection sensor. Further, the emotion estimation unit 38 may estimate the type of emotion of the user on the basis of biometric information (a body surface temperature, a sweat rate, heart rate, or the like) that can be read by sensors provided to other devices (for example, gloves or the like) that the user wears.

The emotion notification unit 40 transmits, to the image distribution apparatus 18, data indicating the type of emotion of the user estimated by the emotion estimation unit 38.

The posture detection unit 42 detects the positions of the plurality of luminescent markers 110 (luminescent markers 110a, 110b, 110c, and 110d) of the HMD 100 appearing in a subject image. Further, the posture detection unit 42 acquires sensor data acquired by the posture sensor 124 of the HMD 100 (posture information), which has been transmitted from the HMD 100. The posture detection unit 42 detects the posture of the HMD 100 (in other words, the posture of the user's head) on the basis of the positions of the plurality of luminescent markers 110 of the HMD 100 appearing in the subject image and the sensor data. The posture of the HMD 100 may be a tilt in 3-axis directions with respect to a reference posture determined in advance in 3-dimensional space. Note that, hitherto, various head tracking methods have been proposed, and the posture detection unit 42 may detect the posture of the HMD 100 by well-known head tracking processing.

The posture notification unit 44 transmits, to the image distribution apparatus 18, data indicating the posture of the HMD 100 detected by the posture detection unit 42.

The message transmission unit 46 transmits, in a case where the input of operation for instructing the transmission of a message is detected by the operation detection unit 32, data of the message to the image distribution apparatus 18.

The display image acquisition unit 48 acquires image data transmitted from the image distribution apparatus 18 (user images described later). The display control unit 50 displays user images acquired by the display image acquisition unit 48 on the display panel 130 of the HMD 100. A user image that is transmitted from the image distribution apparatus 18 includes a left-eye image to be presented to the user's left eye and a right-eye image to be presented to the user's right eye. These images have parallax therebetween. The display control unit 50 displays a left-eye image on the left-eye display panel 130a of the HMD 100 and displays a right-eye image on the right-eye display panel 130b of the HMD 100.

Figure 5:
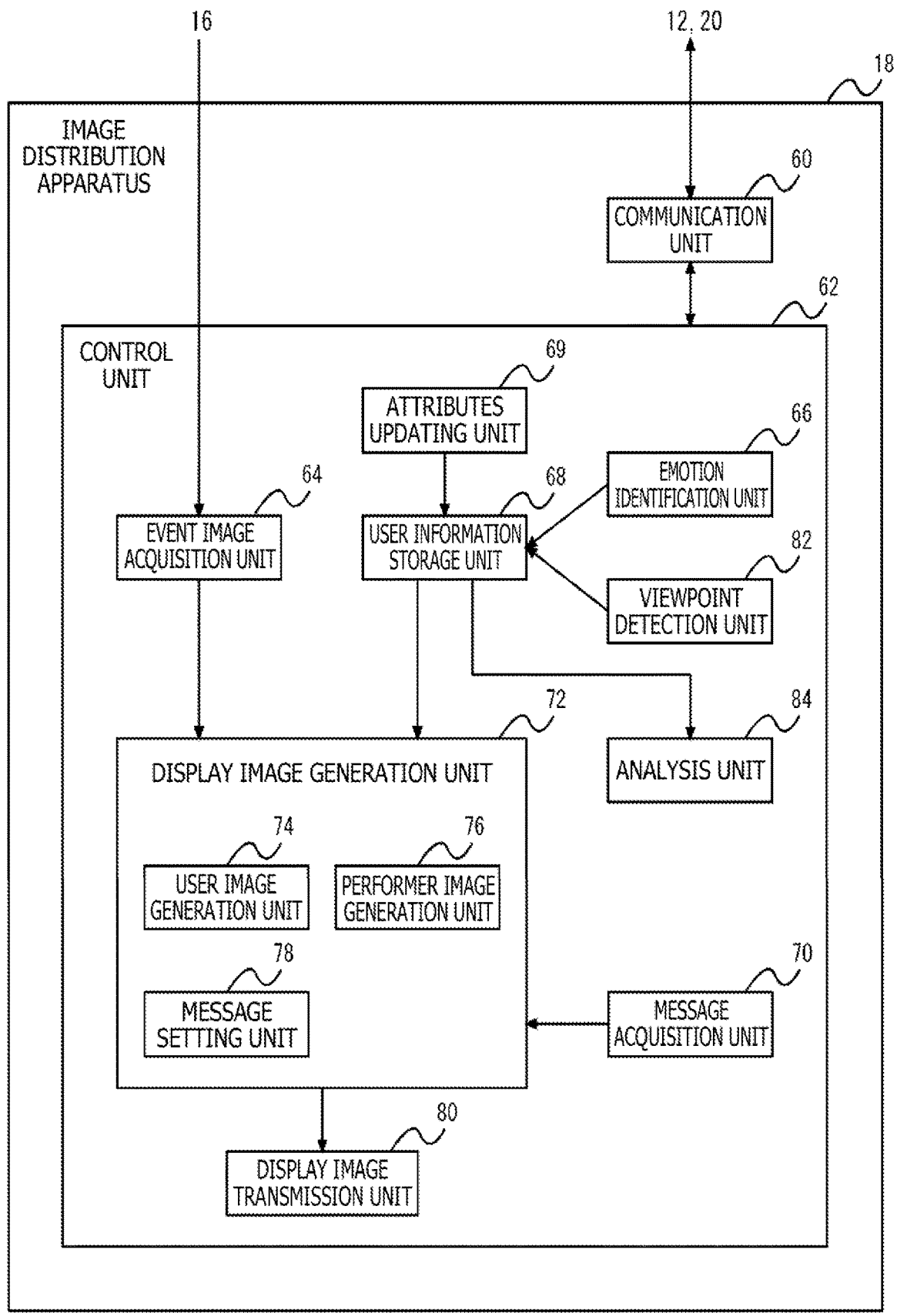
FIG. 5 is a block diagram illustrating functional blocks of an image distribution apparatus of FIG. 1.

FIG. 5 is a block diagram illustrating functional blocks of the image distribution apparatus 18 of FIG. 1. The image distribution apparatus 18 includes a communication unit 60 and a control unit 62. The control unit 62 executes various types of data processing. The communication unit 60 communicates with external apparatus in accordance with a predetermined communication protocol. The control unit 62 transmits/receives data to/from the user-side processing apparatus 12 and the performer-side terminal 20 through the communication unit 60.

The control unit 62 includes an event image acquisition unit 64, an emotion identification unit 66, a user information storage unit 68, an attributes updating unit 69, a message acquisition unit 70, a display image generation unit 72, a display image transmission unit 80, a viewpoint detection unit 82, and an analysis unit 84. A computer program having a plurality of modules corresponding to the plurality of functional blocks (for example, a concert video distribution application) may be installed on the storage of the image distribution apparatus 18. The CPU and/or GPU of the image distribution apparatus 18 may read out the computer program to the main memory to execute the computer program, thereby fulfilling the function of each functional block.

The event image acquisition unit 64 acquires image data output from the camera system 16. The image data corresponds to a plurality of event images taken by the plurality of cameras of the camera system 16. The plurality of event images correspond to a plurality of watching positions that each user can select. That is, in the plurality of event images, the scenes of the event viewed from the corresponding watching positions appear.

The emotion identification unit 66 identifies, on the basis of information associated with the plurality of users watching the same content, which has been detected by the plurality of user-side processing apparatus 12, the types of emotions that the plurality of users are experiencing. In the embodiment, the emotion identification unit 66 receives data indicating the types of emotions of the plurality of users, which has been transmitted from the plurality of user-side processing apparatus 12, to thereby identify the types of emotions that the plurality of users are experiencing. The emotion identification unit 66 stores the types of emotions that the respective users are experiencing in the user information storage unit 68 in association with the corresponding users.

The viewpoint detection unit 82 receives data indicating the postures of the HMDs 100 that the respective users are wearing, which has been transmitted from the plurality of user-side processing apparatus 12. The viewpoint detection unit 82 detects, on the basis of the postures of the HMDs 100 of the respective users, the viewpoints of the corresponding users in user images. A viewpoint is a region or a point at which the user sights in a user image. The viewpoint detection unit 82 stores information indicating the viewpoints of the respective users in the user information storage unit 68 in association with the corresponding users.

The viewpoint detection unit 82 may hold a correspondence relationship between the posture of the HMD 100 and a sight direction and identify a sight direction corresponding to the posture of the HMD 100, to thereby detect a region in a user image that matches the identified sight direction as the viewpoint of the user. In the embodiment, the viewpoint detection unit 82 divides a user image into a plurality of regions of 7 blocks by 4 blocks and detects any of the regions as the viewpoint of each user. Note that, the viewpoint detection unit 82 may detect the viewpoints of the users using a well-known method.

The user information storage unit 68 stores various types of attributes information regarding each user watching a concert video in association with identification information regarding the corresponding user. The attributes information regarding each user includes the type of emotion that the corresponding user is experiencing and the viewpoint of the corresponding user. Further, the attributes information regarding each user also includes setting information regarding the corresponding user, which has been transmitted from the corresponding user-side processing apparatus 12. The setting information includes, for example, an event watching position selected by the corresponding user. It can be said that a watching position is a point from which the user watches an event, and the watching position may be, for example, a seat in a concert venue.

The attributes updating unit 69 updates user attributes information stored in the user information storage unit 68. The message acquisition unit 70 acquires a message transmitted from a certain user of the plurality of users to other users. In the embodiment, the message acquisition unit 70 acquires data of a message transmitted from a certain user-side processing apparatus 12 of the plurality of user-side processing apparatus 12 and inputs the data to the display image generation unit 72.

The display image generation unit 72 generates image data indicating how events are going. The display image generation unit 72 includes a user image generation unit 74, a performer image generation unit 76, and a message setting unit 78. The user image generation unit 74 generates user images that are images to be displayed on the HMDs 100 of the respective users. The user image generation unit 74 generates user images for the individual users on the basis of the watching positions of the corresponding users. The user image generation unit 74 generates, as a user image to be presented to a certain user of the plurality of users, an image including an event image corresponding to a watching position selected by the user and at least one of the plurality of avatars corresponding to the plurality of users.

The avatars may be images having any shape, pattern, or color and may be, for example, images look like a human. The user image generation unit 74 changes the display appearances of the plurality of avatars corresponding to the plurality of users on the basis of the types of emotions of the plurality of users identified by the emotion identification unit 66.

The performer image generation unit 76 generates performer images that are images to be displayed on the performer-side terminal 20. The performer image generation unit 76 generates, as a performer image, an image in which the plurality of avatars corresponding to the plurality of users watching an event appear in appearances based on the types of emotions that the plurality of users are experiencing.

The message setting unit 78 functions as a message distribution unit configured to distribute a message acquired by the message acquisition unit 70 to users experiencing a certain type of emotion of the plurality of users. The message setting unit 78 of the embodiment sets the message acquired by the message acquisition unit 70 to user images to be presented to the users experiencing the certain type of emotion, to thereby present the above-mentioned message to the users experiencing the certain type of emotion.

The display image transmission unit 80 transmits user images for the individual users generated by the user image generation unit 74 to the user-side processing apparatus 12 of the corresponding users. Further, the display image transmission unit 80 transmits performer images generated by the performer image generation unit 76 to the performer-side terminal 20.

The analysis unit 84 serves as a recording unit to record, with regard to the user image 150 at each of the plurality of viewpoints, information associated with the type of emotion that the user at the corresponding viewpoint is experiencing on a predetermined storage area (for example, an analysis result storage unit that is not illustrated) as an analysis result.

Figure 6:
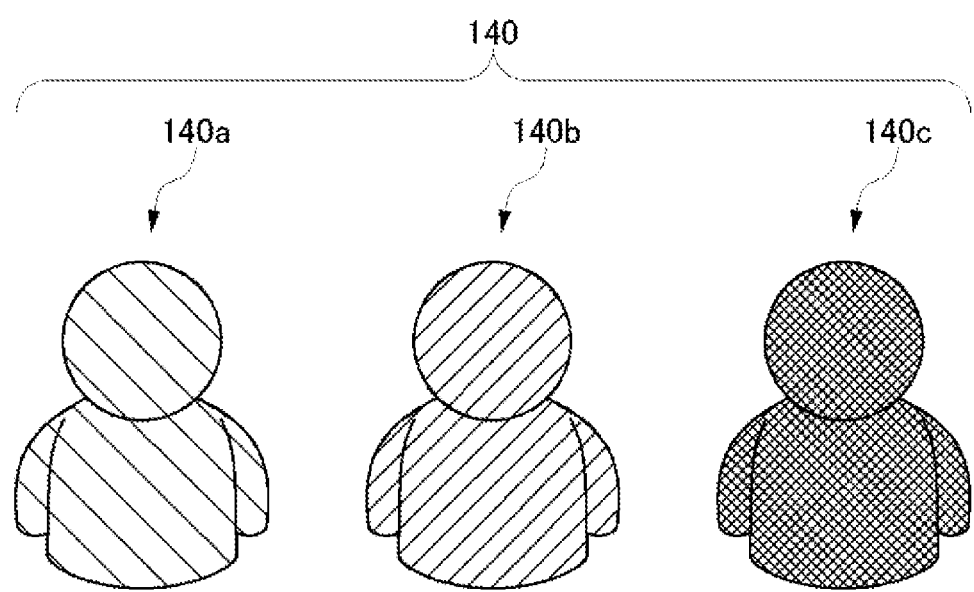
FIG. 6 is a diagram illustrating avatars in the embodiment.

The operation of the live streaming system 10 configured as described above is described. Here, as a plurality of types of emotions of users, different levels of excitement are exemplified. FIG. 6 illustrates avatars 140 of the embodiment. Of the avatars 140, an avatar 140a is an avatar corresponding to a user with a low level of excitement. An avatar 140b is an avatar corresponding to a user with a medium level of excitement. An avatar 140c is an avatar corresponding to a user with a high level of excitement. Although the avatar 140a to the avatar 140c have patterns different from each other in the embodiment, in a modified example, the avatar 140a to the avatar 140c may have shapes or colors different from each other. For example, the avatar 140a may be colored blue, the avatar 140b may be colored yellow, and the avatar 140c may be colored red.

The basic operation of the live streaming system 10 is described. The plurality of user-side processing apparatus 12 execute the following processing in parallel. The user launches a concert watching application on the user-side processing apparatus 12 and selects a live streaming channel of a desired event. The user-side processing apparatus 12 transmits a request for watching the live streaming channel selected by the user to the image distribution apparatus 18. The image distribution apparatus 18 starts to generate an image of the live streaming channel indicated by the watching request (user image), which has been received from the user-side processing apparatus 12, and transmit the generated user image to the user-side processing apparatus 12.

The display image acquisition unit 48 of the user-side processing apparatus 12 acquires the user image transmitted from the image distribution apparatus 18, and the display control unit 50 displays the user image on the HMD 100. When the user inputs operation for switching the watching position to the user-side processing apparatus 12, the user-side processing apparatus 12 transmits, to the image distribution apparatus 18, a request for switching to a watching position selected by the user. The image distribution apparatus 18 performs switching to generate a user image indicating the scene of the event viewed from the watching position selected by the user and transmits the user image to the user-side processing apparatus 12.

The characteristic operation of the live streaming system 10 is described. In each of the plurality of user-side processing apparatus 12, the emotion estimation unit 38 estimates the type of emotion that the user is currently experiencing on the basis of the facial expression of the user imaged by the user camera, and the emotion notification unit 40 notifies the user-side processing apparatus 12 of the estimated type of emotion of the user. Further, in each of the plurality of user-side processing apparatus 12, the posture detection unit 42 detects the posture of the HMD 100, and the posture notification unit 44 notifies the image distribution apparatus 18 of the posture of the HMD 100.

The emotion identification unit 66 of the image distribution apparatus 18 identifies the types of emotions that the respective users watching the live streaming of the same event on the basis of the contents of the notifications from the plurality of user-side processing apparatus 12. The user image generation unit 74 generates, as user images to be presented to the respective users, user images each including an event image from a watching position selected by the corresponding user and at least one of the plurality of avatars corresponding to the plurality of users. For example, avatars included in a user image for a certain user include avatars of other users watching the event from the same watching position as the user or watching positions close to the user. The display image transmission unit 80 transmits the user image including the avatars to the user-side processing apparatus 12, to thereby display the user image on the HMD 100.

Figure 7:
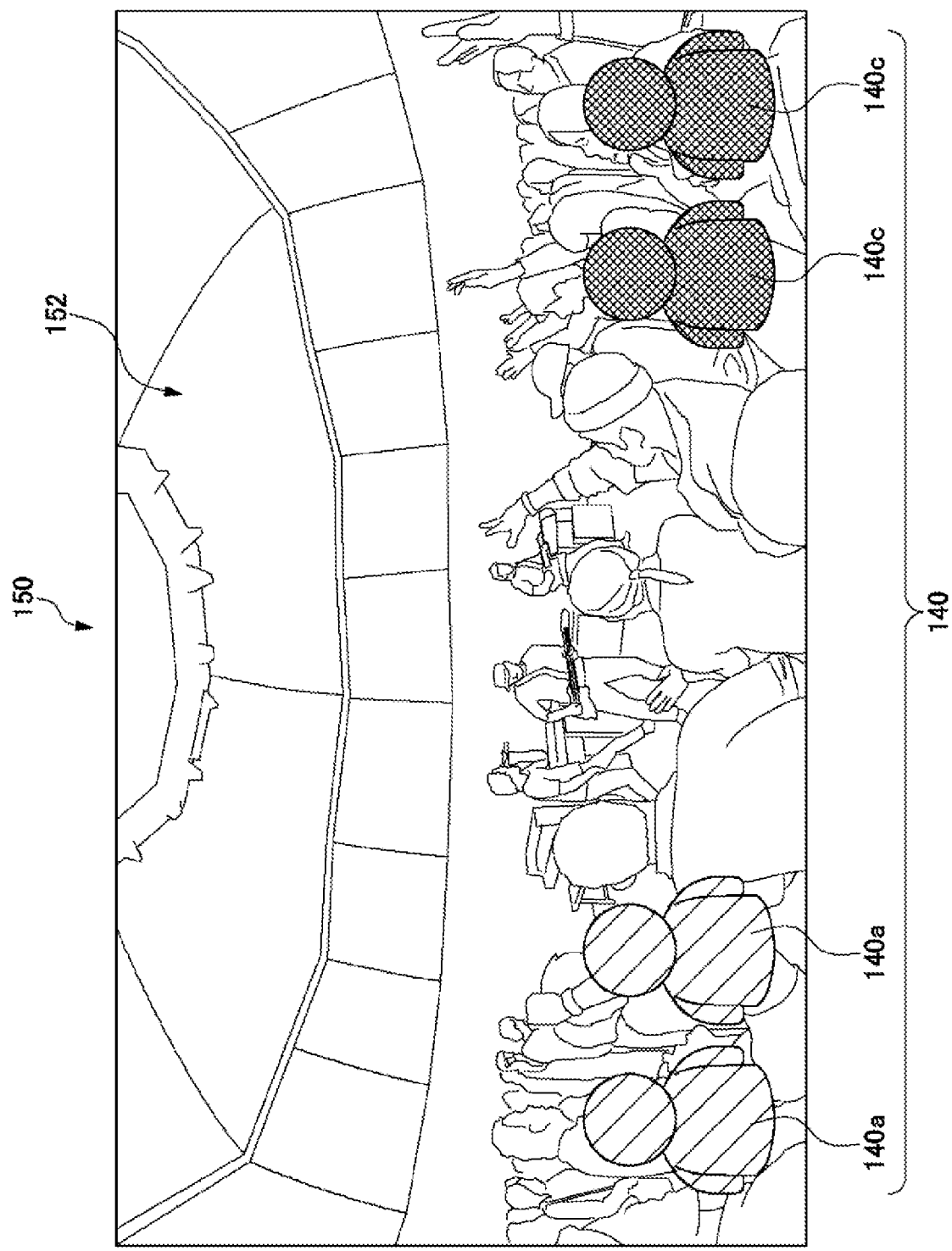
FIG. 7 is a diagram illustrating an exemplary user image.

FIG. 7 illustrates an exemplary user image. The user image 150 includes an event image 152 and the plurality of avatars 140. The two avatars 140a correspond to two users with a low level of excitement, while the two avatars 140c correspond to two users with a high level of excitement. The user image generation unit 74 of the image distribution apparatus 18 generates the user image 150 in which, on the event image 152, the avatars 140 of users near a watching position selected by a user are superimposed in display appearances based on the types of emotions that the users are experiencing.

With the user image 150 of the embodiment, a certain user can easily know emotions that other users watching the same content are experiencing, and the plurality of users can easily share their emotions therebetween. This can provide unique viewing experiences to users watching a VR image, and further increase the value of a live streamed content.

Next, operation in message transmission is described. FIGS. 8(a) to 8(d) illustrate examples of the user image 150. FIG. 8(a) to FIG. 8(c) illustrate the user image 150 that is displayed on the HMD 100 of a user who transmits a message (also referred to as "source user"). Further, FIG. 8(d) illustrates the user image 150 that is displayed on the HMD 100 of a user who receives a message (also referred to as "destination user").

FIG. 8(a) indicates that the user watching the user image 150 inputs, to a controller, which is not illustrated, operation for instructing the transmission of a message. When the display control unit 50 of the user-side processing apparatus 12 detects the input of the operation, the display control unit 50 displays a destination selection icon 154 for selecting the destination of the message on the user image 150 as illustrated in FIG. 8(b). Here, it is assumed that, as the message destination, the group of the avatars 140c (that is, a user group with a high level of excitement) has been selected.

The display control unit 50 of the user-side processing apparatus 12 displays, when the message destination is selected, a message selection window 156 for selecting the content of the message on the user image 150 as illustrated in FIG. 8(c). The message selection window 156 includes, as selectable elements, a plurality of types of emojis (in other words, stickers). When a certain message is selected in the message selection window 156, the message transmission unit 46 of the user-side processing apparatus 12 transmits, to the image distribution apparatus 18, message data specifying the content and destination of the message.

The message acquisition unit 70 of the image distribution apparatus 18 acquires the message data transmitted from the user-side processing apparatus 12 of the source user. The message setting unit 78 of the image distribution apparatus 18 identifies, of users who have selected positions close to the source user (for example, the same watching position), users who match the destination indicated by the message data as destination users. Here, the users who match the destination are the users corresponding to the avatars 140c.

The message setting unit 78 adds the message content indicated by the message data (message image 158) to the user image 150 for the destination users as illustrated in FIG. 8(d). Then, the user image 150 illustrated in FIG. 8(d) is presented to the destination users. According to the mode, users watching the same concert content can be encouraged to communicate with each other and share their emotions therebetween.

Figure 9:
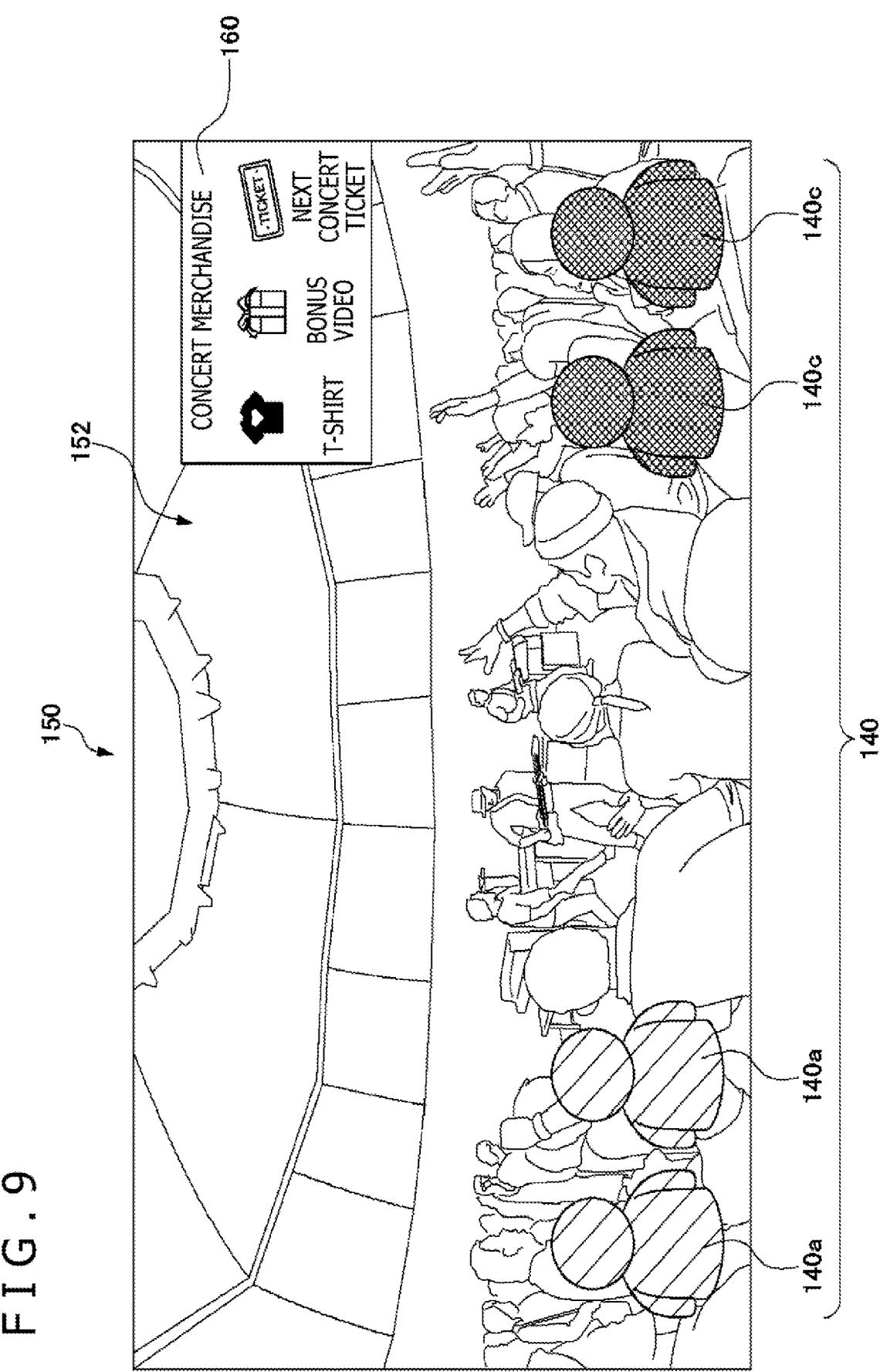
FIG. 9 is a diagram illustrating an exemplary user image.

Next, operation for supporting product sales is described. FIG. 9 illustrates an example of the user image 150. The user image generation unit 74 of the image distribution apparatus 18 generates, in a case where the emotion of the user identified by the emotion identification unit 66 satisfies predetermined conditions, the user image 150 including the event image 152, the avatars 140, and a sales promotion window 160 as an image to be presented to the user. In other words, the user image generation unit 74 generates the user image 150 including the sales promotion window 160 as the user image 150 for users experiencing emotions satisfying the predetermined conditions.

The sales promotion window 160 is an image including information for promoting sales of predetermined products. The sales promotion window 160 may include product icons for purchasing products or electronic data related to an event online. The product icons may include a transition link to the screen of an E-commerce site where the products and electronic data are sold. The conditions for displaying the sales promotion window 160 may include when it is identified that the user is experiencing one or more certain emotions of the plurality of types of emotions and/or the levels of the one or more certain emotions are equal to or higher than a predetermined threshold. For example, the conditions may include when the level of excitement of the user is equal to or higher than the predetermined threshold.

Further, the user image generation unit 74 may change the content of the sales promotion window 160 depending on the type of emotion (or the level thereof) of the user identified by the emotion identification unit 66 or a combination of the plurality of types of emotions (or the levels thereof). For example, different combinations of product icons may be set to the sales promotion window 160 between a case where the user is being impressed and a case where the user is being excited.

According to this mode, it is possible to effectively lead users to a merchandise section on the basis of changes in emotion of the users. For example, with the sales promotion window 160 presented to users with a sufficiently high level of excitement, effective sales promotion can be achieved. On the other hand, the sales promotion window 160 is not displayed to users with a low level of excitement so that it can be prevented that the display of the sales promotion window 160 hurts the feelings of the users with a low level of excitement.

Note that, the user image generation unit 74 desirably places the sales promotion window 160 at a position different from the viewpoint (in other words, the gazing point) of the user in the user image 150 detected by the viewpoint detection unit 82. This is because if the sales promotion window 160 is placed at the viewpoint of the user, the visibility of content to which the user is paying attention drops, with the result that the feelings of the user may be hurt.

Further, the user information storage unit 68 of the image distribution apparatus 18 stores a product purchase history in which the type of emotion (and the level thereof) of the user when he/she has purchased products in the past, and the kinds of the purchased products are associated with each other. For example, the image distribution apparatus 18 may acquire, from an external sales management apparatus, the kinds of products that the user has purchased and the date and time of purchase, and store, in the user information storage unit 68, a product purchase history in which the type of emotion of the user on the date and time of purchase and the kinds of the purchased products are associated with each other.

Further, the user information storage unit 68 of the image distribution apparatus 18 stores conditions for displaying the sales promotion window 160 on the user image 150 (display conditions), which are defined for each of the plurality of users in association with the corresponding users. The attributes updating unit 69 of the image distribution apparatus 18 refers to each user's product purchase history stored in the user information storage unit 68, and updates the display conditions for the sales promotion window 160 for each user depending on the type of emotion of the corresponding user when he/she has purchased the products in the past.

The attributes updating unit 69 may update the display conditions for the sales promotion window 160 so that the display conditions match the type or level of emotion of the user when he/she has purchased the products in the past (or a combination of a plurality of emotions). For example, the level of excitement of the user when he/she has purchased the products in the past may be a threshold for displaying the sales promotion window 160. According to the mode, the sales promotion window 160 can be displayed at timings optimum for the respective users, and more effective sales promotion can be achieved.

Next, operation related to the display of performer images is described. During the live streaming of an event, the performer image generation unit 76 of the image distribution apparatus 18 generates a performer image. The display image transmission unit 80 transmits the performer image to the performer-side terminal 20 so that the performer-side terminal 20 displays the performer image. In the embodiment, the performer image generation unit 76 generates a first performer image 170 or a second performer image 172, which are described later, on the basis of operation input by a performer to the performer-side terminal 20.

Figure 10:
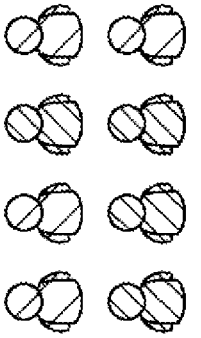
FIG. 10 is a diagram illustrating an exemplary first performer image.

FIG. 10 illustrates an example of the first performer image 170. The performer image 170 indicates a plurality of watching positions that users can select and the types of emotions of the corresponding users who have selected the watching positions in association with each other. In the first performer image 170 of FIG. 10, the plurality of avatars 140 in appearances in which the types of emotions of the plurality of users are reflected are arranged at the positions of the respective seats of a concert venue.

In actuality, the performer image generation unit 76 may generate the first performer image 170 in which the plurality of avatars 140 are superimposed on an image in which the audience area of the event venue appears, which has been taken by the camera system 16. A performer can easily grasp, by checking the first performer image 170, the emotions of the users watching the event remotely. For example, the performer can grasp the ratio of audience members with a high level of excitement and the positions of the audience members, and the ratio of audience members with a low level of excitement and the positions of the audience members. In the example of FIG. 10, the performer can find that audience members watching the event from the right section on the second floor of the event venue have a low level of excitement, and accordingly take appropriate actions such as calling out to the users in the right section on the second floor of the event venue.

Figure 11:
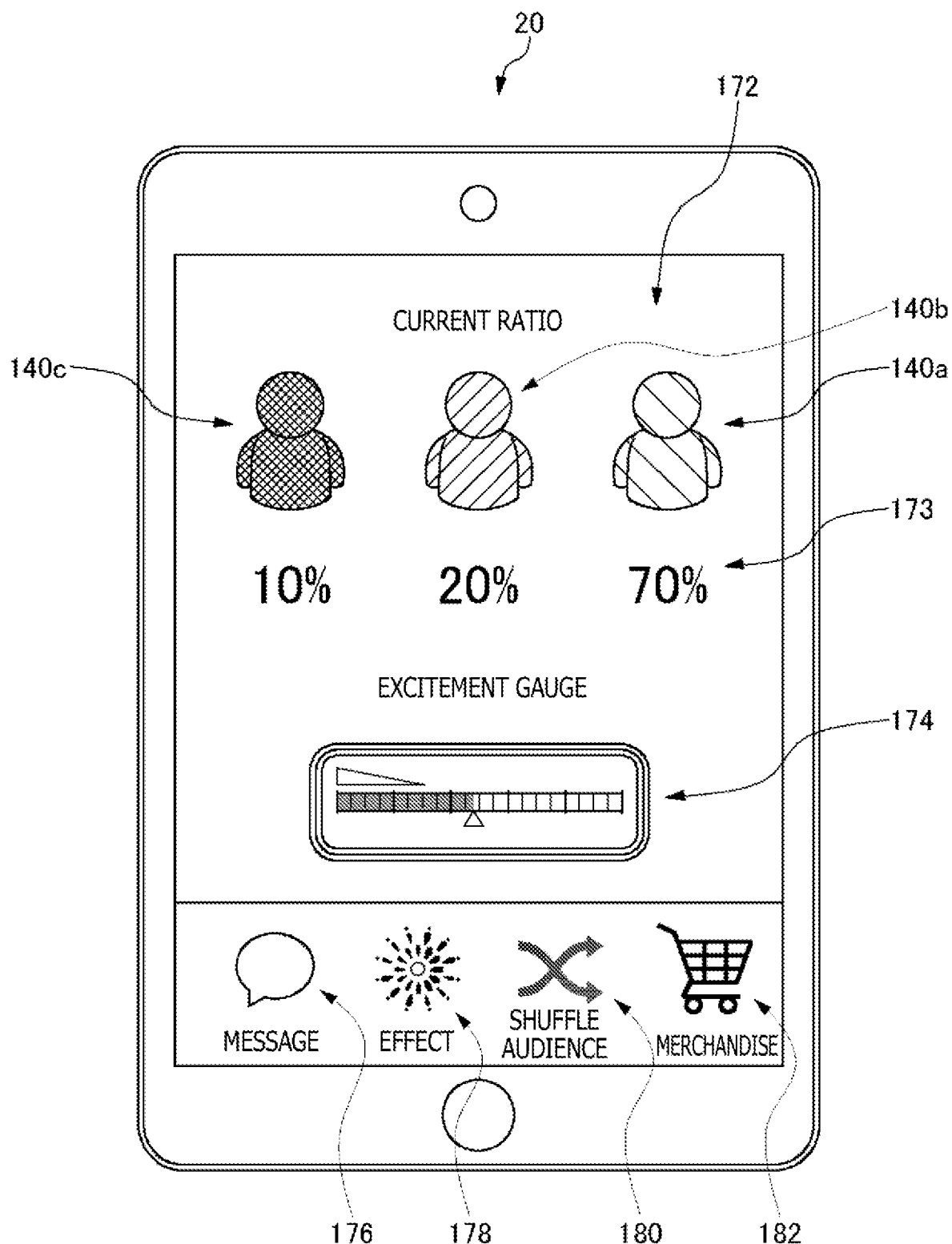
FIG. 11 is a diagram illustrating an exemplary second performer image.

FIG. 11 illustrates an example of the second performer image 172. The second performer image 172 includes user emotion information 173, a gauge image 174, a message icon 176, an effect icon 178, a shuffle icon 180, and a merchandise icon 182. The user emotion information 173 is information indicating the level of a certain emotion that a plurality of users are experiencing. The user emotion information 173 of FIG. 11 indicates that the ratio of users with a low level of excitement (corresponding to the avatar 140a) is 70%, the ratio of users with a medium level of excitement (corresponding to the avatar 140b) is 20%, and the ratio of users with a high level of excitement (corresponding to the avatar 140c) is 10%.

The gauge image 174 is an image also indicating the level of a certain emotion that a plurality of users are experiencing by the length of a bar graph. The gauge image 174 of FIG. 11 is set so that as the level of excitement of the plurality of users increases, the bar graph extends to the left. The performer image generation unit 76 of the image distribution apparatus 18 aggregates the types of emotions that the plurality of users watching the live streaming of the same event are experiencing, and reflects the aggregation result in the user emotion information 173 and the gauge image 174.

According to the mode, an aggregation result of the types of emotions that a plurality of users watching the live streaming of the same event are experiencing (in other words, statistical information) can be presented to an event performer in an easy-to-understand manner. This allows the performer to easily perform the event preferable for emotions that the users are experiencing, and easily take appropriate actions to the users. Note that, although the user emotion information 173 and the gauge image 174 are set to the second performer image 172 in the embodiment, in a modified example, these images may be set to the first performer image 170 or the user image 150.

Figure 8:
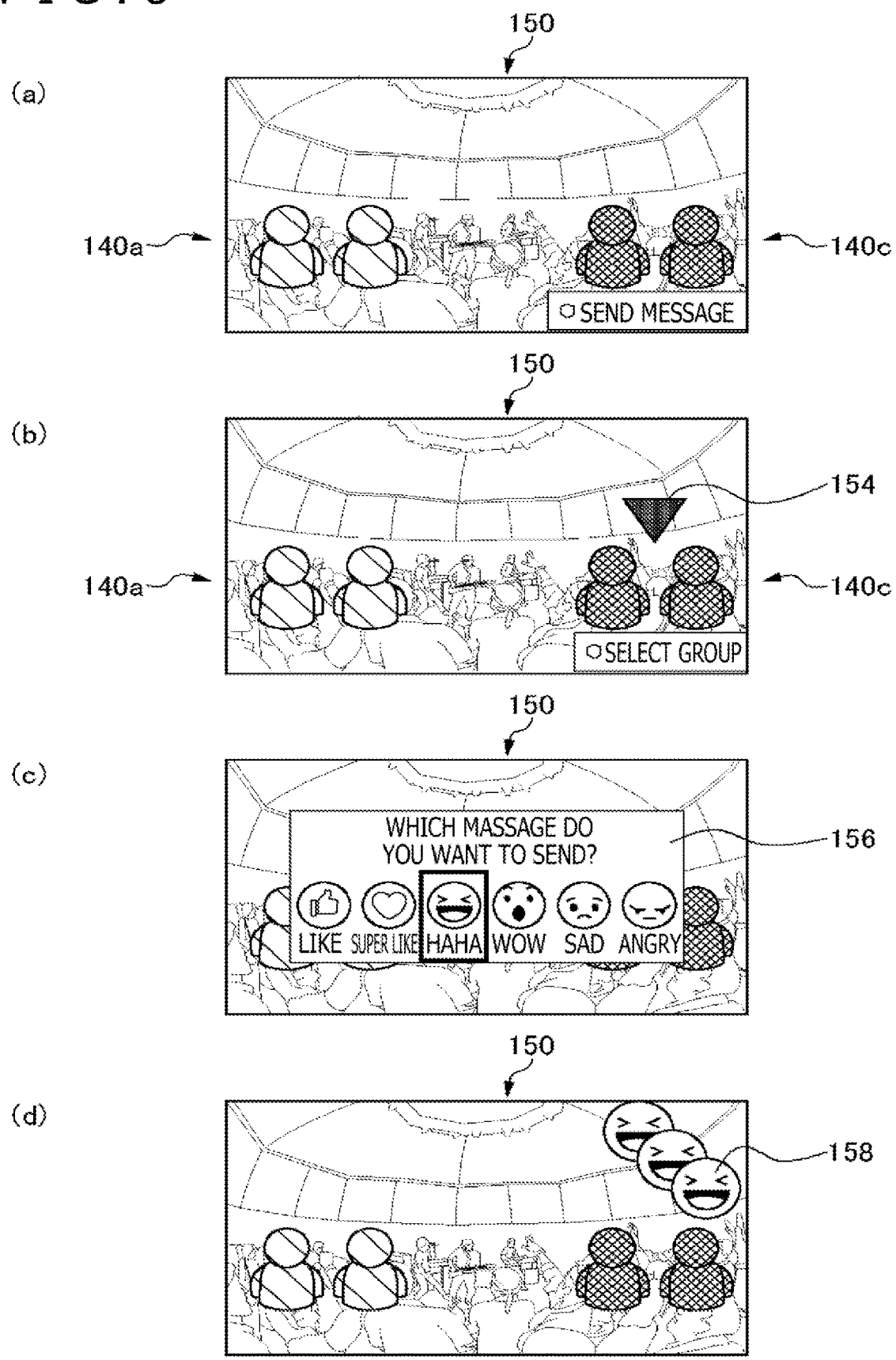
FIGS. 8(a) to 8(d) are diagrams illustrating exemplary user images.

The message icon 176, the effect icon 178, the shuffle icon 180, and the merchandise icon 182 activate functions for supporting actions of a performer to users. The message icon 176 is an icon for transmitting a message to users who are experiencing a certain emotion, for example. In a case where the message icon 176 is selected, the performer-side terminal 20 may display the destination selection icon 154 and the message selection window 156, which are illustrated in FIG. 8, and transmit message data indicating the destination users and the message content to the image distribution apparatus 18. In this case, the image distribution apparatus 18 may transmit, like message transmission between users, a message selected by the performer to the user-side processing apparatus 12 of users selected by the performer.

The effect icon 178 is an icon for instructing executing predetermined effects. Although the predetermined effects are virtual effects in virtual space (fireworks, background changes, special character appearance, or the like, hereinafter also referred to as "special effect") in the embodiment, in a modified example, the predetermined effects may be effects in real space (fireworks, lighting changes, or the like). In a case where the effect icon 178 is selected, the performer-side terminal 20 may transmit data for instructing special effects to the image distribution apparatus 18. When receiving the instruction for special effects, the user image generation unit 74 of the image distribution apparatus 18 may add the special effect image to the user image 150.

The shuffle icon 180 is an icon for switching the watching positions of a plurality of users. In a case where the shuffle icon 180 is selected, the performer-side terminal 20 may transmit data for instructing shuffle to the image distribution apparatus 18. When receiving the shuffle instruction, the user image generation unit 74 of the image distribution apparatus 18 switches the watching positions of a plurality of users in virtual space, and newly generates the user image 150 corresponding to the watching positions after the switching. Note that, along with the switching of the watching positions of the users, the display positions of the avatars 140 in the virtual space are also changed. The watching positions of the plurality of users may be switched randomly. Alternatively, a plurality of users experiencing the same type of emotion may be collected at close positions (or the same position).

The merchandise icon 182 is an icon for promoting the sales of event-related products. In a case where the merchandise icon 182 is selected, the performer-side terminal 20 may transmit data for instructing sales promotion to the image distribution apparatus 18. When receiving the sales promotion instruction, the user image generation unit 74 of the image distribution apparatus 18 may generate the user image 150 including the sales promotion window 160 illustrated in FIG. 9. Note that, when receiving the sales promotion instruction, the user image generation unit 74 may add the sales promotion window 160 only to the user image 150 for users who satisfy the display conditions for the sales promotion window 160.

Next, operation for supporting analysis related to users who have watched the live streaming of an event is described. The analysis unit 84 of the image distribution apparatus 18 starts analysis processing when receiving an analysis start instruction from a terminal of a staff of a streaming service (not illustrated), when date and time determined in advance arrive, or regularly. The analysis unit 84 records, as an analysis result, a result obtained by acquiring the viewpoints and types of emotions of the respective users stored in the user information storage unit 68, and aggregating the types of emotions that the users have experienced at the corresponding viewpoints. The image distribution apparatus 18 may further include an analysis result display unit configured to display the recorded analysis result to a predetermined display. Further, the image distribution apparatus 18 may further include an analysis result transmission unit configured to transmit the recorded analysis result to the terminal or the like of the staff of the streaming service.

FIG. 12 illustrates an exemplary analysis result. In the analysis result of FIG. 12, avatars of users gazing at respective viewpoints are superimposed on a live streaming video from one watching position. Further, in the analysis result of FIG. 12, the avatars of the respective users are in different appearances based on the types of emotions (here, the levels of excitement). Specifically, in the analysis result of FIG. 12, the user image 150 is divided into regions of 7 blocks by 4 blocks, and each region after the division is defined as a viewpoint. With this analysis result, it is found that users watching around the center has a high level of excitement. This analysis result can support determining, for example, when the video of an event is recorded to be distributed or users watch the event in a time shift manner, whether to zoom the center portion of the user image 150 (that is, a viewpoint region in which the level of excitement of the users is high) to distribute the user image 150. The analysis unit 84 may record the analysis result illustrated in FIG. 12 for each watching position that the users can select.

Note that, the analysis unit 84 may record, at each of a plurality of timings in the distribution period of the user image 150 (that is, an event video), the analysis result indicating the types of emotions that the users at the respective viewpoints have experienced. Further, the analysis unit 84 may record the above-mentioned analysis result for each watching position (that is, each point from which the users watch the event) that the users can select. With this, the users' emotional changes over time and a difference in emotion of the users between the watching positions can be clarified.

In addition, the analysis unit 84 may record an analysis result with main parameters being the watching positions that the users can select. For example, the types of emotions of one or more users are aggregated at the respective watching positions that the users can select, and an analysis result in which the watching positions and the aggregation result of the types of emotions are associated with each other may be recorded. This analysis result can support determining, for example, when the video of an event is recorded to be distributed or users watch the event in a time shift manner, whether to set a watching position at which the level of excitement of users is high as a default watching position (or a recommended watching position), for example.

The present invention has been described above on the basis of the embodiment. It will be understood by those skilled in the art that the embodiment is merely an example, the components or the processing processes can be variously modified, and such modified examples are also within the scope of the present invention. Now, modified examples are described.

A first modified example is described. The user image generation unit 74 of the image distribution apparatus 18 generates, in a case where the number of users experiencing a certain type of emotion or the ratio of such users is equal to or more than a predetermined value, the user image 150 further including special effects determined in advance. The special effects may be effects in VR space and may be, for example, effects by computer graphics (fireworks, background changes, special character appearance, or the like). It can be said that the special effects are premium effects for the audience of an event, and the special effects may be effects that are displayed only when display conditions for special effects are satisfied.

The number of people, ratio, and the types of emotions that serves as the display conditions for special effects may be appropriately defined on the basis of the knowledge of a live stream distributor, an experiment using the live streaming system 10, or the like. For example, on the condition that half of all users watching the live streaming of an event has a medium level of excitement or higher, the user image generation unit 74 may display special effects on the user image 150 to be presented to each user. Displaying special effects in VR space that a plurality of users watch depending on changes in emotion of the respective users can bring a sense of unity to the plurality of users, and make the live streaming of an event more highly entertaining.

A second modified example is described. The user image generation unit 74 of the image distribution apparatus 18 may generate the user image 150 in which one or more avatars corresponding to one or more users experiencing a certain type of emotion are arranged in a certain region determined in advance in the virtual space of an event. In other words, the user image generation unit 74 may arrange a plurality of avatars corresponding to a plurality of users experiencing the same type of emotion at the same watching position or close watching positions.

For example, the user image generation unit 74 may arrange the avatars of users with a high level of excitement in a first region (for example, a front center section on the first floor in a concert venue), the avatars of users with a low level of excitement in a second region (for example, a center section on the second floor in the concert venue), and the avatars of users with a high level of impression in a third region (for example, a rear center section on the first floor in the concert venue). In this modified example, the watching position of each user may be dynamically changed depending on a change in emotion that the corresponding user is experiencing.

According to this modified example, users (the avatars of the users) experiencing the same emotion are arranged at close positions. This can bring a sense of unity to the users and make the live streaming of an event more highly entertaining.

A third modified example related to the second modified example is described. The user image generation unit 74 of the image distribution apparatus 18 may generate the user image 150 in which the avatars of users experiencing a first type of emotion are arranged in a first position or region, and the avatars of users experiencing a second type of emotion, which is opposite to the first type of emotion, are arranged in the same position or region as the first region or a position or region close to the first region.

The first type of emotion may be an emotion not preferable to an event, while the second type of emotion may be an emotion preferable to the event. For example, the user image generation unit 74 may arrange the avatars of users with a low level of excitement, which corresponds to the first type of emotion, and the avatars of users with a high level of excitement, which corresponds to the second type of emotion, in the same region or close positions.

According to this modified example, the avatars of users experiencing opposite emotions are arranged at close positions so that users with one of the emotions are likely to be influenced by users with the other emotion. For example, the avatar of a second user with a high level of excitement is placed around the watching position of a first user with a low level of excitement so that the first user can recognize the level of excitement of the second user, with the result that the first user is likely to be excited. For example, this can support increasing the level of excitement of all users simultaneously watching a concert.

A fourth modified example is described. Although the image distribution apparatus 18 renders user images in the above-mentioned embodiment, in a modified example, the user-side processing apparatus 12 may render user images. For example, instead of the image distribution apparatus 18, the user-side processing apparatus 12 may include the user image generation unit 74. In this case, the image distribution apparatus 18 may further include, instead of the user image generation unit 74, a content information setting unit and a content information transmission unit.

The content information setting unit of the image distribution apparatus 18 sets content information including an event image corresponding to the viewpoint position of a user, and the types and display positions of one or more avatars to be displayed on a user image. Note that, the content information may further include the content and display position of a message transmitted from a certain user or a performer. The content information transmission unit of the image distribution apparatus 18 transmits the content information to the user-side processing apparatus 12. The user image generation unit 74 of the user-side processing apparatus 12 renders the user image in which the avatars and the message are superimposed on the event image on the basis of the content information received from the image distribution apparatus 18. The display control unit 50 of the user-side processing apparatus 12 displays the locally rendered user image on the HMD 100.

Further, the user-side processing apparatus 12 may execute, instead of the image distribution apparatus 18, the processing of determining whether or not to display a sales promotion window and the processing of drawing the sales promotion window on a user image in a superimposed manner.

A fifth modified example is described. Although the plurality of user-side processing apparatus 12 estimate the emotion of the corresponding users in the above-mentioned embodiment, in a modified example, the image distribution apparatus 18 may estimate the emotions of the respective users. For example, the plurality of user-side processing apparatus 12 may transmit subject images in which the users appear to the image distribution apparatus 18. The emotion identification unit 66 of the image distribution apparatus 18 may have the function of the emotion estimation unit 38 of the embodiment, and estimate the emotions of the respective users on the basis of the subject images transmitted from the plurality of user-side processing apparatus 12, to thereby identify the types of emotions of the plurality of users.

A sixth modified example is described. Although not described in the above-mentioned embodiment, messages that are sent between users or a performer and users are not limited to text or emojis (stickers). Examples of messages may include sound data detected by the microphone 126 of the HMD 100.

In the above-mentioned embodiment, a VR image to be displayed on the HMD 100 includes the live streaming image of a real event. In a modified example, a VR image to be displayed on the HMD 100 may be neither an image of a real event nor a live streaming image but may be a distribution image of a game, a recorded distribution image, or the like.

Further, in the information processing system, a sales promotion window may be displayed on a VR image on the basis of the emotion of a user watching content irrespective of whether the content that the user is watching is a live streaming image or not, whether avatars are displayed or not, and whether the user wears the HMD 100 or not. For example, in a case where the level of excitement of a user playing a video game with a normal display is high, a sales promotion window may be displayed on the screen of the video game.

Further, in the information processing system, the analysis processing based on the emotion, viewpoint, watching position, and the like of a user wearing the HMD 100 may be executed irrespective of whether a VR image to be displayed on the HMD 100 is a live streaming image or not and whether avatars are displayed or not.

In the above-mentioned embodiment, emotions that users are experiencing are estimated on the basis of the facial expressions of the users and biometric information regarding the users. In a modified example, however, in a system configured to receive comments posted by users, the image distribution apparatus 18 may estimate emotions that the users are experiencing on the basis of the details of comments posted by the users (key words, key phrases indicating emotions, or the like). Further, users may input the types of emotions that they are currently experiencing (being excited, impressed, enjoyed, or the like), and information indicating the input types of emotions may be transmitted from the user-side processing apparatus 12 to the image distribution apparatus 18.

Optional combinations of the embodiment and modified examples described above are also effective as embodiments of the present invention. New embodiments created by combinations provide the advantageous effect of the embodiment and modified examples combined. Further, it will be understood by those skilled in the art that the functions to be achieved by respective constituent requirements described in the claims may be achieved by corresponding components described in the embodiment or the modified examples or by a combination of the components. For example, the constituent requirements described in the claims may be achieved by any one of the functions of the user-side processing apparatus 12 and the functions of the image distribution apparatus 18 or a combination thereof.

REFERENCE SIGNS LIST

10 Live streaming system, 12 User-side processing apparatus, 18 Image distribution apparatus, 38 Emotion estimation unit, 66 Emotion identification unit, 72 Display image generation unit, 74 User image generation unit, 76 Performer image generation unit, 78 Message setting unit, 82 Viewpoint detection unit, 84 Analysis unit, 100 HMD

INDUSTRIAL APPLICABILITY

The technology described in the present disclosure is applicable to systems configured to display images on head mounted displays.

The invention claimed is:

1. An information processing system, comprising:
   an identification unit configured to identify, with regard to a plurality of users each wearing a head mounted display to watch same content, types of emotions that the plurality of users are experiencing based on information associated with the plurality of users, the information being detected by a predetermined apparatus; and
   a generation unit configured to generate, as an image to be displayed on the head mounted display of a certain user of the plurality of users, an image including the content and at least one of a plurality of avatars corresponding to the plurality of users, wherein the generation unit changes display appearances of the plurality of avatars depending on the types of emotions of the plurality of users identified by the identification unit,
   wherein the generation unit generates the image further including a predetermined effect in a case where a plurality of users experiencing a same type of emotion is equal to or more than a predetermined value, and
   wherein the generation unit generates the image by moving and grouping together a plurality of avatars into a predetermined region if users corresponding to the plurality of avatars are experiencing the same type of emotion.

2. The information processing system according to claim 1, wherein
   the content includes an image of a predetermined event, and
   the generation unit further generates, as an image to be presented to a performer of the event, an image in which the plurality of avatars corresponding to the plurality of users appear in appearances based on the emotions that the plurality of users are experiencing.

3. The information processing system according to claim 1, further comprising:
   a message acquisition unit configured to acquire a message transmitted from a certain user of the plurality of users; and
   a message distribution unit configured to distribute the message acquired by the message acquisition unit to a user experiencing a certain type of emotion of the plurality of users.

4. The information processing system according to claim 1, wherein
   the generation unit generates the image further including information indicating a level of a certain type of emotion that the plurality of users are experiencing.

5. The information processing system according to claim 1, wherein
   the generation unit generates the image by moving and grouping together a second plurality of avatars into the certain region if second users corresponding to the second plurality of avatars are experiencing an second type of emotion opposite to the type of emotion.

6. An information processing system, comprising:
   an identification unit configured to identify, with regard to a plurality of users each wearing a head mounted display to watch same content, types of emotions that the plurality of users are experiencing based on information associated with the plurality of users, the information being detected by a predetermined apparatus;
   a detection unit configured to detect each of viewpoints of the plurality of users in the content based on a posture of the head mounted display worn by the corresponding users; and
   a recording unit configured to record, with regard to each of the plurality of viewpoints in the content, information associated with the types of emotions that the users at the respective viewpoints have experienced; and
   a display image generation unit for generating image data displaying statistical information regarding an amount of each of the types of the emotions that the users at the respective viewpoints have experienced,
   wherein the generation unit generates the image by moving and grouping together a plurality of avatars into a predetermined region if users corresponding to the plurality of avatars are experiencing a same type of emotion.

7. An information processing method comprising, causing a computer or a plurality of computers to execute, in a distributed manner:
   identifying, with regard to a plurality of users each wearing a head mounted display to watch same content, types of emotions that the plurality of users are experiencing based on information associated with the plurality of users, the information being detected by a predetermined apparatus; and
   generating, as an image to be displayed on the head mounted display of a certain user of the plurality of users, an image including the content and at least one of a plurality of avatars corresponding to the plurality of users,
   wherein the step of generating changes display appearances of the plurality of avatars depending on the types of emotions that the plurality of users are experiencing,
   wherein the step of generating further includes generating a predetermined effect in a case where a plurality of users experiencing a same type of emotion is equal to or more than a predetermined value, and
   wherein the generation unit generates the image by moving and grouping together a plurality of avatars in a predetermined region if users corresponding to the plurality of avatars are experiencing the same type of emotion.

8. A non-transitory computer readable medium having stored thereon a computer program for a computer, comprising:
   by an identification unit, identifying, with regard to a plurality of users each wearing a head mounted display to watch same content, types of emotions that the plurality of users are experiencing based on information associated with the plurality of users, the information being detected by a predetermined apparatus; and
   by a generation unit, generating, as an image to be displayed on the head mounted display of a certain user of the plurality of users, an image including the content and at least one of a plurality of avatars corresponding to the plurality of users,
   wherein the function of generating changes display appearances of the plurality of avatars depending on the types of emotions that the plurality of users are experiencing,
   wherein the generation unit generates the image further including a predetermined effect in a case where a plurality of users experiencing a same type of emotion is equal to or more than a predetermined value, and
   wherein the generation unit generates the image by moving and grouping together a plurality of avatars in a predetermined region if users corresponding to the plurality of avatars are experiencing the same type of emotion.

* * * * *